(12) United States Patent  (10) Patent No.: US 8,305,296 B2
Iba et al.  (45) Date of Patent: Nov. 6, 2012

(54) HEAD-MOUNTED TYPE IMAGE DISPLAY DEVICE

(75) Inventors: Yoichi Iba, Hachioji (JP); Ryohei Sugihara, Machida (JP); Seiji Tatsuta, Hachioji (JP)

(73) Assignee: Olympus Corporation, Tokyo (JP)

( * ) Notice: Subject to any disclaimer, the term of this patent is extended or adjusted under 35 U.S.C. 154(b) by 455 days.

(21) Appl. No.: 12/730,607

(22) Filed: Mar. 24, 2010

(65) Prior Publication Data
US 2010/0245211 A1  Sep. 30, 2010

(30) Foreign Application Priority Data
Mar. 25, 2009  (JP) ................. 2009-074420

(51) Int. Cl.
*G09G 5/00*  (2006.01)
(52) U.S. Cl. ................ 345/8; 345/7; 348/115
(58) Field of Classification Search .......... 345/7–9; 359/630–633; 348/115
See application file for complete search history.

(56) References Cited

U.S. PATENT DOCUMENTS 5,748,375 A * 5/1998 Yamana ............ 359/622
2002/0070904 A1* 6/2002 Okuyama ............ 345/7
2002/0113754 A1* 8/2002 Nakanishi ............ 345/7

FOREIGN PATENT DOCUMENTS
JP  2006-003879  1/2006
JP  2008-535001  8/2008

OTHER PUBLICATIONS

International Publication No. WO 2006/102368 A2, dated Sep. 28, 2006 (Abstract only).

* cited by examiner

*Primary Examiner* — Kevin M Nguyen
*Assistant Examiner* — Sepideh Ghafari
(74) *Attorney, Agent, or Firm* — Scully, Scott, Murphy & Presser, PC

(57) ABSTRACT

A hexahedron prism in which a first optical surface and a second optical surface opposed to each other are approximately parallel, the inner angles θ between the first optical surface and each of a third optical surface and a fourth optical surface opposed to each other are equal, a fifth optical surface and a sixth optical surface opposed to each other are configured inclining toward each other and the distance therebetween becomes narrow from the third optical surface to the fourth optical surface, and further, a light beam from a image display element enters through a first partial optical surface into the hexahedron prism, reflects inside the prism and is emitted through a second partial optical surface to an eye pupil of a user.

10 Claims, 11 Drawing Sheets

FIG. 10
(a)
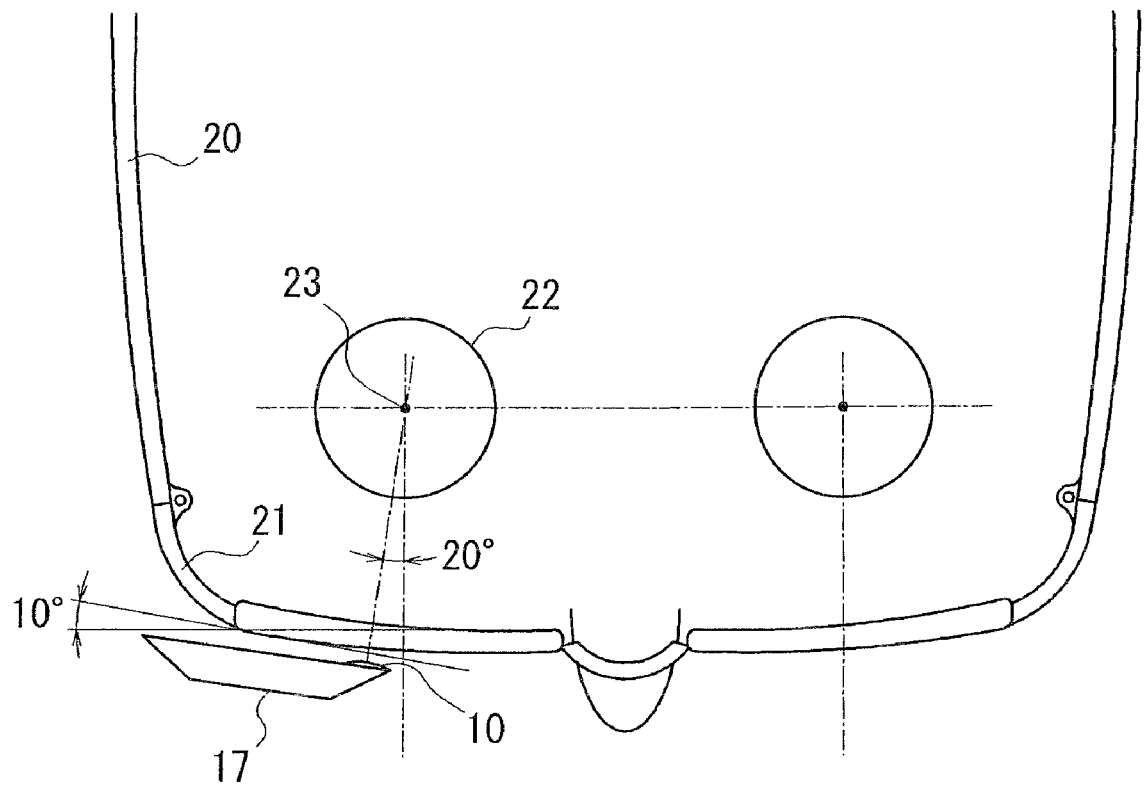
(b)
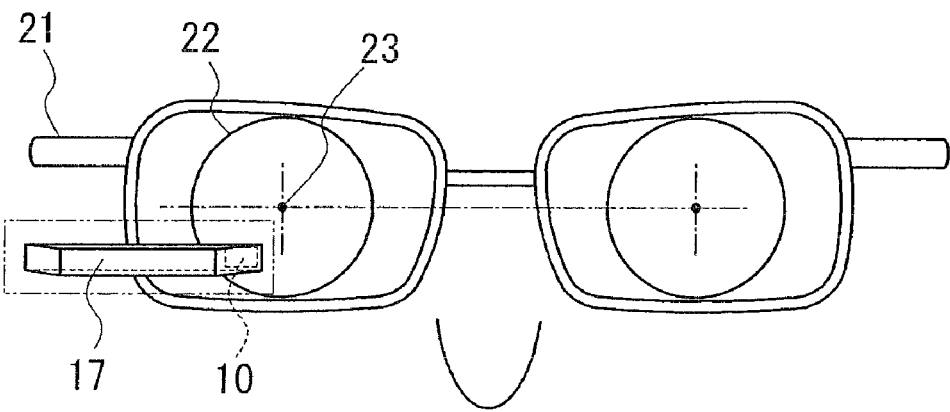

HEAD-MOUNTED TYPE IMAGE DISPLAY DEVICE

CROSS-REFERENCE TO RELATED APPLICATION

The present application claims priority from Japanese Application No. 2009-074420, filed on Mar. 25, 2009, the content of which is incorporated herein by reference.

FIELD OF THE INVENTION

The present invention relates to a head-mounted type image display device.

BACKGROUND OF THE INVENTION

In recent years, what is called a head-mounted type image display device (or a head-mount display) has attracted attention. As for such a head-mounted type image display device, the video image light or the still image light emitted from a compact image display element (e.g. a liquid crystal display panel and an organic electroluminescence) is guided to a user's eye pupil by an optical technique such as a mirror or a prism.

In this case, methods for superimposing the external light and the image light include methods that use an optical element (what is called a combiner) such as a half mirror and a pupil division method. The pupil division method has advantages such as compact, lightweight and a large field of outside view as disclosed in Japanese Patent Application Laid-Open No. 2006-3879, for example.

In addition, an optical system from a image display element to an eye pupil by multiple total reflections of image light inside a prism is known as disclosed in Japanese Patent Application Laid-Open No. 2008-535001, for example.

SUMMARY OF THE INVENTION

However, for the conventional optical system described in the above-mentioned related art, it is difficult to provide a large diameter of an optical pupil in a transverse direction. In particular, with respect to the pupil division method, it is important to extend the width of an optical pupil in a transverse direction in order to correspond to the interpupillary distance which is different depending on an observer.

Further, as for the optical system that employs a total reflection, an interface with the air should be maintained appropriately on the optical surface. In other words, for the optical surface that performs a total reflection, it is required to prevent water droplets and dust from entering into the air-spacing (what is called an air gap). In particular, it is important for the optical system for a head-mounted type image display device to provide an air gap that can withstand the external environment such as rain and wind while satisfying the requirements such as compact and lightweight.

Consequently, in the present invention, a head-mounted type image display device whose width of an optical pupil is large in the direction of interpupillary distance is provided. Further, the head-mounted type image display device is compact, lightweight and can withstand the external environment.

The above-mentioned problem can be solved by a head-mounted type image display device including a hexahedron prism in which a first optical surface and a second optical surface opposed to each other are approximately parallel, the inner angles $\theta$ between the first optical surface and each of a third optical surface and a fourth optical surface opposed to each other are equal, a fifth optical surface and a sixth optical surface opposed to each other are configured to be inclined toward each other and the distance therebetween becomes narrow from the third optical surface to the fourth optical surface, and a light beam from an image display element enters into the hexahedron prism through a first partial optical surface, which is a part of the first optical surface, reflects off the third optical surface first, then off the first optical surface, the second optical surface, the first optical surface and the fourth optical surface and exits through a second partial optical surface, which is another part of the first optical surface, in the direction of a user's eye pupil, thereby projecting an image. In this case, it could be said that the hexahedron prism has a tapered construction in which a height direction becomes narrow from the incidence side to the exit side. In addition to this, the reflection inside the hexahedron prism can be the reflection by a mirror surface and a total reflection, which can be selected appropriately depending on each optical surface.

In the above-mentioned construction, it is preferable that the inner angle $\theta$ is approximately 30 degrees, and further, as for the hexahedron prism adjacent to the second partial optical surface (that is, an exiting end part of the hexahedron prism), it is preferable that the width of the projection section in the direction of optical axis is equal to or less than 4 mm.

Moreover, it is preferable that the first partial optical surface and the second partial optical surface are covered with an integrally molded common optical member across an air gap interposed therebetween, and that the integrally molded common optical member acts as a convex lens with respect to the light beam that exits through the second partial optical surface. In other words, the optical member can be considered as an integral molding of a convex lens and a protection member (or a holding member) of the hexahedron prism. Further, the optical member can be an integral molding of materials that are different in a part where the light beam passes through (e.g. a convex lens) and in other parts (which is called 2-color molding or a double molding).

In addition, the integrally molded common optical member can act also as a wedge prism with respect to the light beam that exits through the second partial optical surface and as a wedge prism also with respect to the light that is incident from the image display unit on the first partial optical surface. In other words, the optical member can be considered as an integral molding of a convex lens, two wedge prisms and a protection member (or a holding member) of a hexahedron prism. The optical member can also be an integral molding of materials that are different in a part where a light beam passes through (e.g. a convex lens and a wedge prism) and in other parts.

Moreover, the light beam from the image display element can be incident on the first partial optical surface at an incidence angle $\phi$ through the integrally molded common optical member. In other words, it is possible to configure so that the image light enters obliquely into the hexahedron prism and exits obliquely therefrom (that is called an inversed V shape separated at the top). At this time, the aberration that occurs when the light beam enters obliquely into the first optical surface can be decreased by interposing a wedge prism therebetween. In other words, in a preferable configuration, the wedge angle of the wedge prism is equal to the incidence angle $\phi$ with respect to the first optical surface and the image light enters vertically into the wedge prism. Further, even when the light beam exits from the hexahedron prism, it is preferable that the exit angle $\phi$ with respect to the first optical surface is equal to the wedge angle of the wedge prism.

In addition, it is preferable that the incidence angle φ is in the range from 5 to 15 degrees.

Further, it is preferable that the normal line of the first optical surface and the second optical surface is configured to be disposed so that it is inclined at an angle from 5 to 20 degrees with respect to the visual axis of the user in the frontal direction. In other words, it is preferable that the longitudinal direction of the hexahedron prism and the line that connects both eye pupils of the user are disposed to be inclined at an angle of 5 to 20 degrees.

Moreover, it is preferable that the axis of the light beam that exits through the first optical surface of the hexahedron prism in the direction of the eye pupil of the user and the visual axis of the user in the frontal direction form an angle of 20±5 degrees in the horizontal direction and an angle of 10±5 degrees in the vertical direction. In other words, it is preferable that the display position of the image is located in the range of 20±5 degrees in the horizontal direction and 10±5 degrees in the vertical direction, when viewing from the user.

In addition, the head-mounted type image display device is used together with an eyeglasses and it is preferable that the light beam that exits from the hexahedron prism projects the image in the direction of the eye pupil of the user through the lenses of the eyeglasses.

According to the present invention, a head-mounted type image display device having a large width of the optical pupil in the direction of interpupillary distance can be provided. Further, the head-mounted type image display device is compact, lightweight and can withstand the external environment.

BRIEF DESCRIPTION OF THE DRAWING

FIG. 10 is a diagram illustrating a preferred disposition of an optical unit in accordance with the embodiment of the present invention.

DESCRIPTION OF THE PREFERRED EMBODIMENTS

Embodiments of the present invention will be described below with reference to the drawings.

First Embodiment

Figure 1:
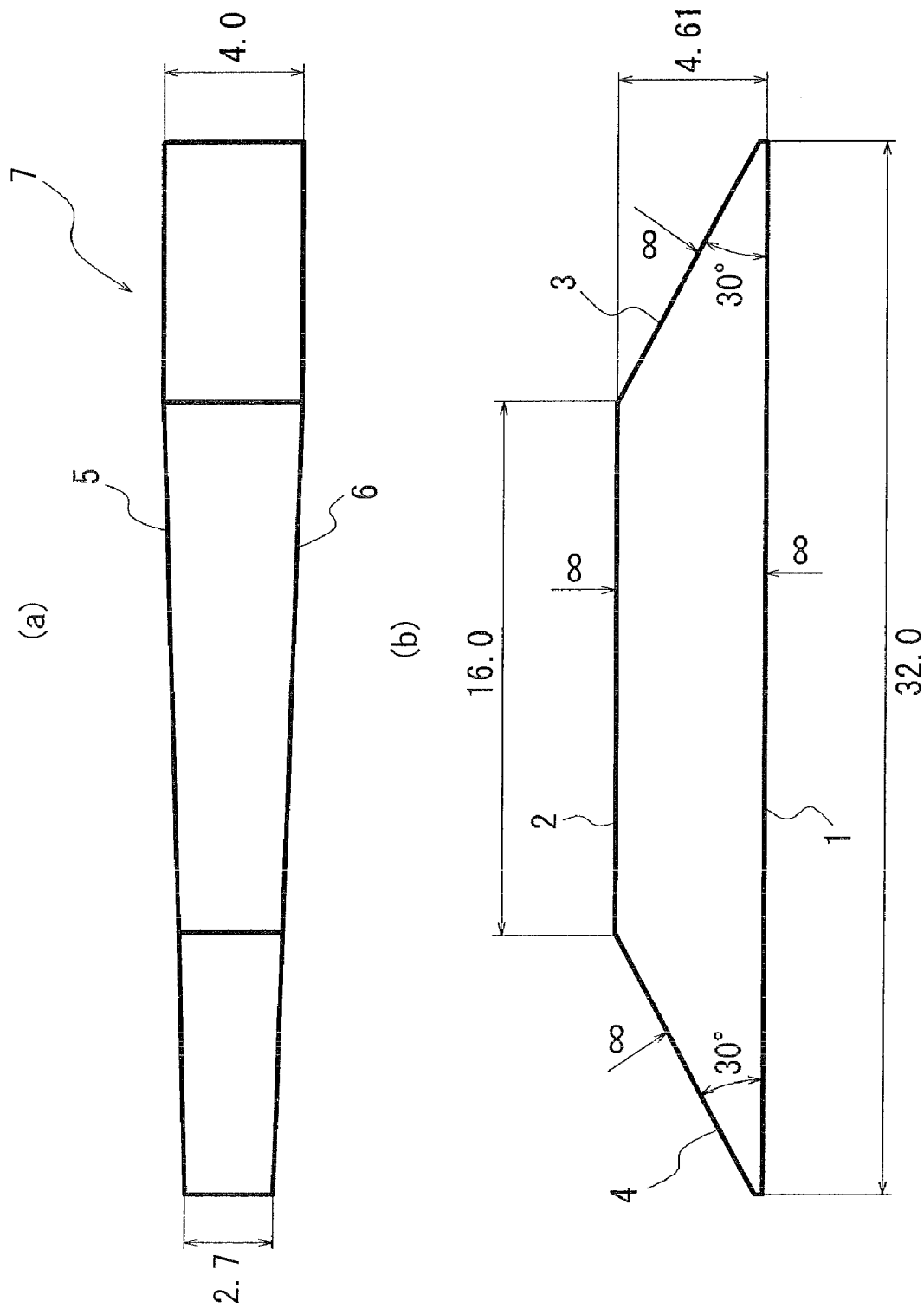
FIG. 1 is a diagram illustrating a hexahedron prism in accordance with an embodiment of the present invention.

FIG. 1 is a diagram illustrating a hexahedron prism 7 used to the embodiment of the present invention. FIG. 1(a) is an elevation view and FIG. 1(b) is a plan view. The hexahedron prism 7 shown in FIG. 1 includes a first optical surface 1, a second optical surface 2, a third optical surface 3, a fourth optical surface 4, a fifth optical surface 5 and a sixth optical surface 6.

The first optical surface 1 and the second optical surface 2 are opposed to each other in the hexahedron and are approximately parallel to each other. The third optical surface 3 and the fourth optical surface 4 are opposed to each other in the hexahedron and are inclined to face each other with respect to the first optical surface 1. In other words, the third optical surface 3 and the fourth optical surface 4 constitute what is called an inversed V shape separated at the top. Further, the inner angle θ between the first optical surface 1 and the third optical surface 3 is approximately equal to the inner angle between the first optical surface 1 and the fourth optical surface 4. In this embodiment, both of the inner angles adopt the configuration of 30 degrees. Moreover, since the first optical surface 1 and the second optical surface 2 are parallel, the inner angle between the second optical surface 2 and the third optical surface 3 is equal to the inner angle between the second optical surface 2 and the fourth optical surface 4. In addition, the third optical surface 3 and the fourth optical surface 4 are treated with a mirror coating.

In other words, in the hexahedron prism 7 in accordance with the present embodiment, as shown in FIG. 1, the first optical surface 1, the second optical surface 2, the third optical surface 3 and the fourth optical surface 4 constitute a cross section having a shape of isosceles trapezoid. Further, in the cross-section view of the trapezoid, the first optical surface 1 is longer than the second optical surface 2 and the second optical surface 2 is longer than the third optical surface 3 and the fourth optical surface 4. More specifically, in the present embodiment, the first optical surface 1 of the cross section is 32 mm and the second optical surface 2 is 16 mm. Further, the distance between the first optical surface 1 and the second optical surface 2 is 4.61 mm.

On the other hand, the fifth optical surface 5 and the sixth optical surface 6 are opposed to each other in the hexahedron and are gently inclined to face each other. For this inclination, as can be seen from FIG. 1, the distance between the fifth optical surface 5 and the sixth optical surface 6 becomes narrow from the third optical surface 3 to the fourth optical surface 4. Further, near the fourth optical surface 4, it is preferable that the distance between the fifth optical surface 5 and the sixth optical surface 6 is equal to or less than 4 mm. In the present embodiment, the distance is 2.7 mm. In addition, near the third optical surface 3 of the present embodiment, the distance between the fifth optical surface 5 and the sixth optical surface 6 is 4 mm.

Figure 2:
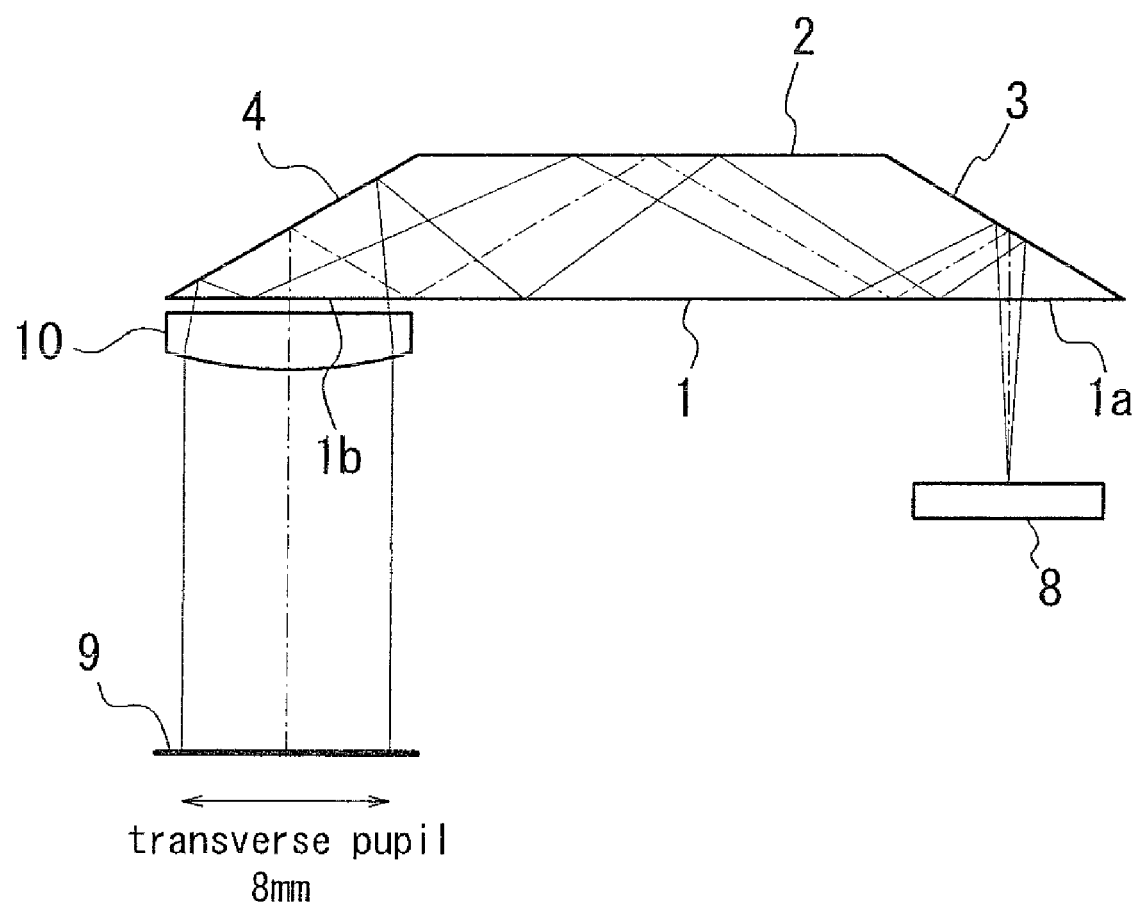
FIG. 2 is a diagram illustrating a light guiding optical system in accordance with the embodiment of the present invention.

FIG. 2 is a diagram illustrating the embodiment of a light guiding optical system according to the present invention.

The light guiding optical system shown in FIG. 2 is provided with the hexahedron prism 7 and an eyepiece 10. The eyepiece 10 is a plano-convex lens and is configured to be disposed so that the flat surface thereof is adjacent to the first optical surface 1 which is close to the fourth optical surface 4.

However, the first optical surface 1 and the flat surface of the eyepiece 10 are adjacent, but are not joined. This is because, as described later, near the eyepiece 10, the first optical surface acts both as a transmissive surface and a total reflection surface. As for the image display element 8, it should be noted that it is possible to appropriately select among a liquid crystal panel, an organic EL panel and the like.

As shown in FIG. 2, the image light which is emitted from the image display element 8 is incident on the first partial optical surface 1a, which is a part of the first optical surface 1. Thereafter the image light reflects off or totally reflects off the third optical surface 3 first, then off the first optical surface 1, the second optical surface 2, the first optical surface 1 and the fourth optical surface 4, in that order, and exits through the second partial optical surface 1b, which is another part of the first optical surface 1. Further, the image light which exits through the second partial optical surface 1b enters into the adjacent eyepiece 10 and exits to the eye pupil position 9 of the user by the positive power of the eyepiece 10.

As shown in FIG. 2, the image light that enters through the first partial optical surface 1a, which is a part of the first optical surface 1, reflects off the third optical surface 3 first, and is again incident on the first partial optical surface 1a (from inside). At this time, since the light reflects off at an inclination angle (about 30 degrees according to the present embodiment) of the third optical surface 3, the incidence angle (about 60 degrees according to the present embodiment) on the first partial optical surface 1a is larger than the critical angle. In other words, the image light in this case totally reflects off the first partial optical surface 1a. That is, the first partial optical surface 1a functions as a transmissive surface and a total reflection surface at the same time.

The same phenomenon occurs also with respect to the second partial optical surface 1b, which is another part of the first optical surface 1, and the fourth optical surface 4. In other words, the light beam totally reflects off the second partial optical surface 1b, thereafter totally reflects off the fourth optical surface 4, thereby incident on the first optical surface 1 at an incidence angle which is equal to or less than the critical angle, and finally passes through the first optical surface 1.

As described above, the hexahedron prism 7 in accordance with the present invention takes advantage of the nature of critical angle. Therefore the refractive index difference at the interface of the hexahedron prism 7 is important. Consequently, it is preferable that the hexahedron prism 7 and the eyepiece 10 are disposed with an air distance (what is called air gap) interposed therebetween.

In addition, as can be seen from FIG. 2, as for the light guiding optical system according to the present invention, the transverse pupil diameter is large. For example, in the present embodiment, although the distance between the first optical surface 1 and the second optical surface 2 is 4.61 min (see FIG. 1), the transverse pupil diameter is 8 mm. Such phenomenon cannot occur when the light beam propagates lineally between the first optical surface 1 and the second optical surface 2. However, such phenomenon can be achieved by propagating the light beam while repeating total reflections between the first optical surface 1 and the second optical surface 2.

Figure 3:
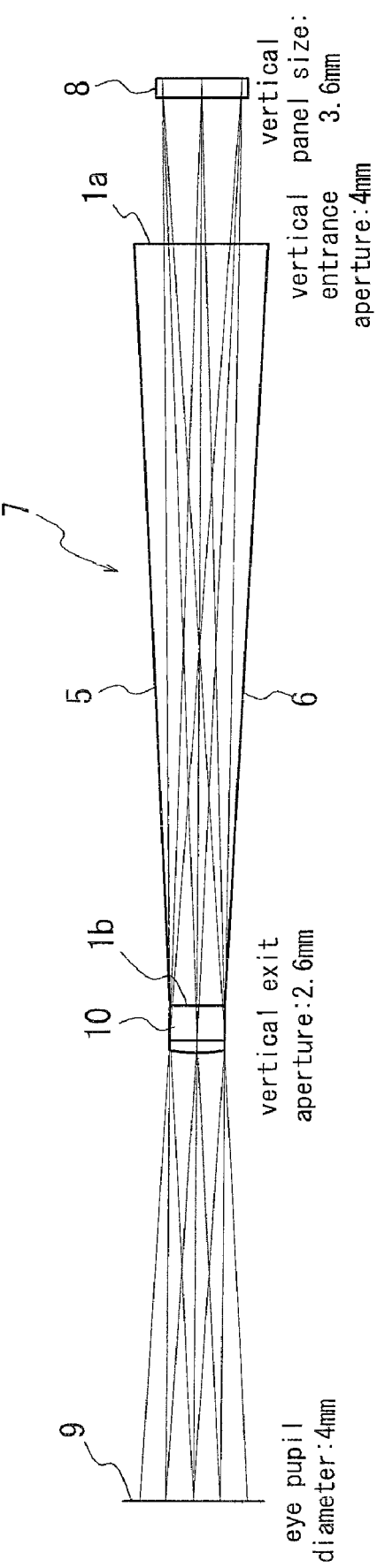
FIG. 3 is a diagram illustrating the light beam in a longitudinal direction of the light guiding optical system in accordance with the embodiment of the present invention.

In order to illustrate the lengthwise light beam of the light guiding optical system of the present embodiment, in FIG. 3, total reflections are omitted for rectilinear representation. In other words, total reflections on the third optical surface 3, the first optical surface 1, the second optical surface 2, the first optical surface 1 and the fourth optical surface 4 are omitted and a light beam diagram is illustrated by a cross section which is parallel to the first optical surface 1 or the second optical surface 2 in FIG. 2.

As described in FIG. 1 and the explanation thereof, in the hexahedron prism 7 of the present embodiment, the fifth optical surface and the sixth optical surface are configured to be inclined toward each other, which can be seen from FIG. 3 in which the vertical diameter of the exit aperture (that is, the second partial optical surface 1b) is smaller than the vertical diameter of the entrance aperture (that is, the first partial optical surface 1a). In particular, in the present embodiment shown in FIG. 3, the vertical diameter of the entrance aperture is 4 mm and the vertical diameter of the exit aperture is 2.6 mm.

As illustrated above, in the hexahedron prism 7 of the present embodiment, although the vertical diameter of the exit aperture is smaller than the vertical diameter of the entrance aperture, the image light can be transmitted efficiently from the image display element 8 which is larger than the vertical diameter of the exit aperture to the eye pupil 9 which is larger than the vertical diameter of the exit aperture. In other words, in the light guiding optical system of the present embodiment, a lengthwise optical pupil position is located near the exit aperture or the eyepiece 10. It should be noted that the lengthwise optical pupil position refers to a position where the off-axis principal light beam which is shifted in a longitudinal direction intersects with the optical axis.

It should be noted that in the present embodiment shown in FIG. 3, the size of the image display element 8 in a longitudinal direction is 3.6 mm, and even if the luminous flux is emitted from the upper edge or the lower edge of the image display element 8, it efficiently reaches the eye pupil 9 whose size is 4 mm through the exit aperture having a vertical diameter of 2.6 mm. In other words, while effectively realizing image composition of the pupil division method by making the entrance aperture smaller, the hexahedron prism 7 can project a bright image by efficiently transmitting the light beam from the large image display element 8 to the eye pupil.

Second Embodiment

Next, another embodiment of the light guiding optical system in accordance with the present invention is illustrated with reference to FIG. 4.

Figure 4:
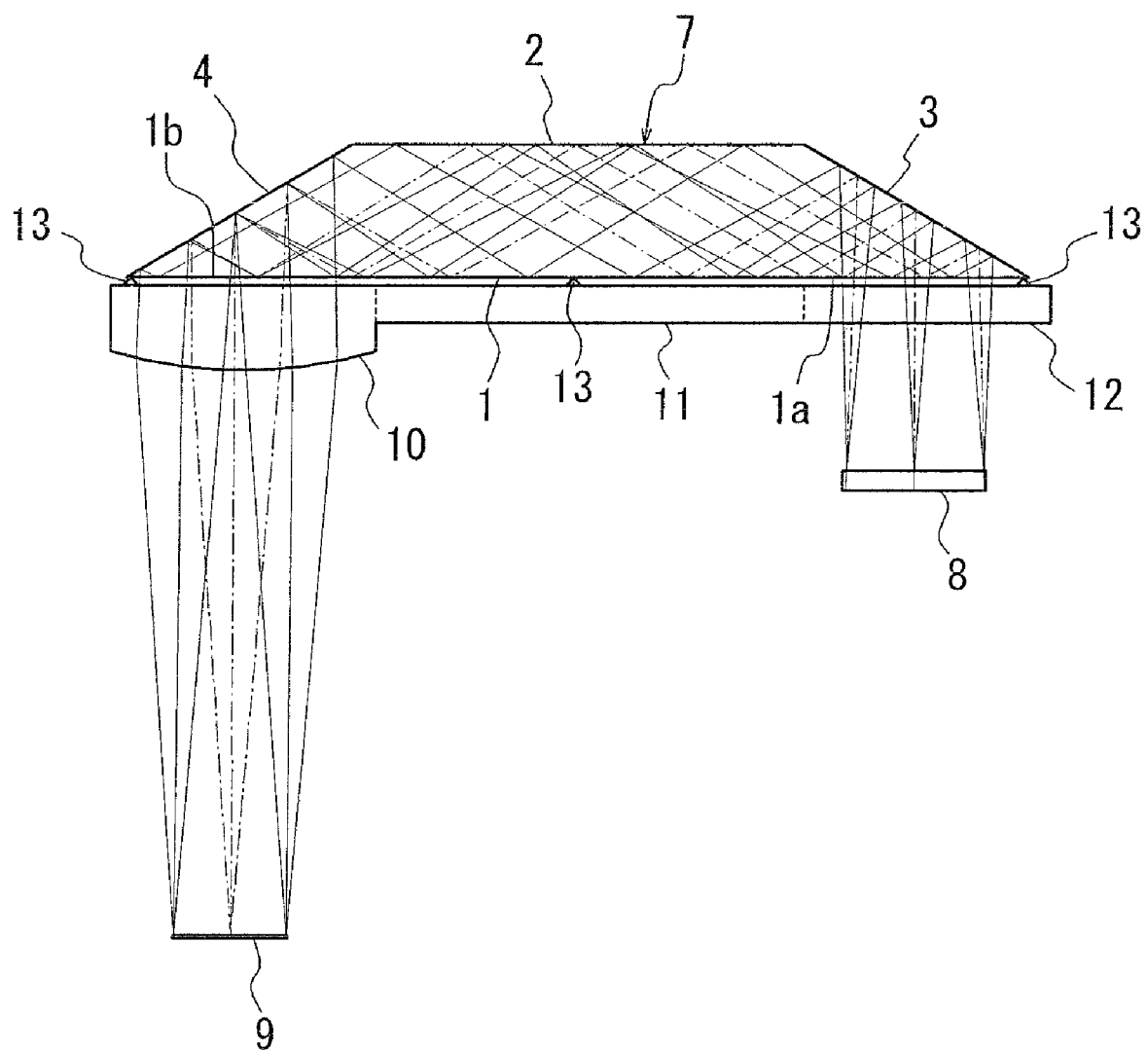
FIG. 4 is a diagram illustrating the light guiding optical system in accordance with another embodiment of the present invention.

The light guiding optical system shown in FIG. 4 is constituted by the hexahedron prism 7 and an integrally molded optical member 11, and outputs the image light from the image display element 8 to the eye pupil 9 of the user.

The hexahedron prism 7 shown in FIG. 4 can be the same hexahedron prism 7 illustrated in the first embodiment. In other words, the hexahedron prism 7 shown in FIG. 4 includes the first optical surface 1, the second optical surface 2, the third optical surface 3, the fourth optical surface 4, the fifth optical surface 5 and the sixth optical surface 6. The first optical surface 1 and the second optical surface 2 are opposed to each other in the hexahedron and are approximately parallel to each other. The third optical surface 3 and the fourth optical surface 4 are opposed to each other in the hexahedron and are inclined to face each other with respect to the first optical surface 1. Further, the inner angle θ between the first optical surface 1 and the third optical surface 3 is approximately equal to the inner angle between the first optical surface 1 and the fourth optical surface 4. In addition, the fifth optical surface 5 and the sixth optical surface 6 that are not shown in FIG. 4 are opposed to each other in the hexahedron and are gently inclined to face each other. Moreover, the third optical surface 3 and the fourth optical surface 4 are treated with a minor coating.

As can be understood from FIG. 4, in the light guiding optical system of the present embodiment, the image light which is emitted from the image display element 8 is incident on the first partial optical surface 1a, which is a part of the first optical surface 1, and transmits therethrough. Thereafter the image light reflects off or totally reflects off the third optical surface 3 first, then off the first optical surface 1, the second optical surface 2, the first optical surface 1 and the fourth optical surface 4, in that order, and exits through the second partial optical surface 1b, which is another part of the first optical surface 1. At this time, the first partial optical surface 1a and the second partial optical surface 1b are covered with the integrally molded optical member 11 across an air gap interposed therebetween, and the integrally molded optical member 11 acts as a convex lens with respect to the light beam that exits through the second partial optical surface 1b. In other words, the integrally molded optical member 11 can be considered as an integral molding of the eyepiece 10 and the protection member (that is, a protection window 12) of the hexahedron prism 7. Moreover, the integrally molded optical member 11 according to the present embodiment is integrally molded by materials that are different between in a part where a light beam passes through (the eyepiece 10 and the protection window 12) and in other parts (which is called 2-color molding or a double molding).

Further, since the hexahedron prism 7 and the integrally molded optical member 11 are held with an air gap interposed therebetween, a projection 13 is molded on a part of the integrally molded optical member 11. Of course, it is preferable that the projection 13 is also molded together with the eyepiece 10, the protection window 12 and the like. In addition, it is preferable that the projection 13 is disposed on the part of the first optical surface 1 where the image light does not totally reflect off. In the present embodiment, the projection 13 is disposed in the vicinity of the ridge line parts formed between the first optical surface 1 and the third optical surface 3 and between the first optical surface 1 and the fourth optical surface 4 and around the center of the first optical surface 1.

In general, the light guiding optical system used for the head-mounted type image display device of the pupil division method is constituted by downsizing each component so that one's field of outside view will not be obstructed. Because of this, the hexahedron prism 7 and the eyepiece 10 are also very compact components and it is not easy to hold these components with an appropriate air gap interposed therebetween. However, as in the case of the embodiment of the present invention, the eyepiece 10 and the protection window 12 and the like are integrally molded to create one optical member 11 and the integrally molded optical member 11 and the hexahedron prism 7 are held with an air gap interposed therebetween, thereby dramatically facilitating the production of the head-mounted type image display device.

Figure 5:
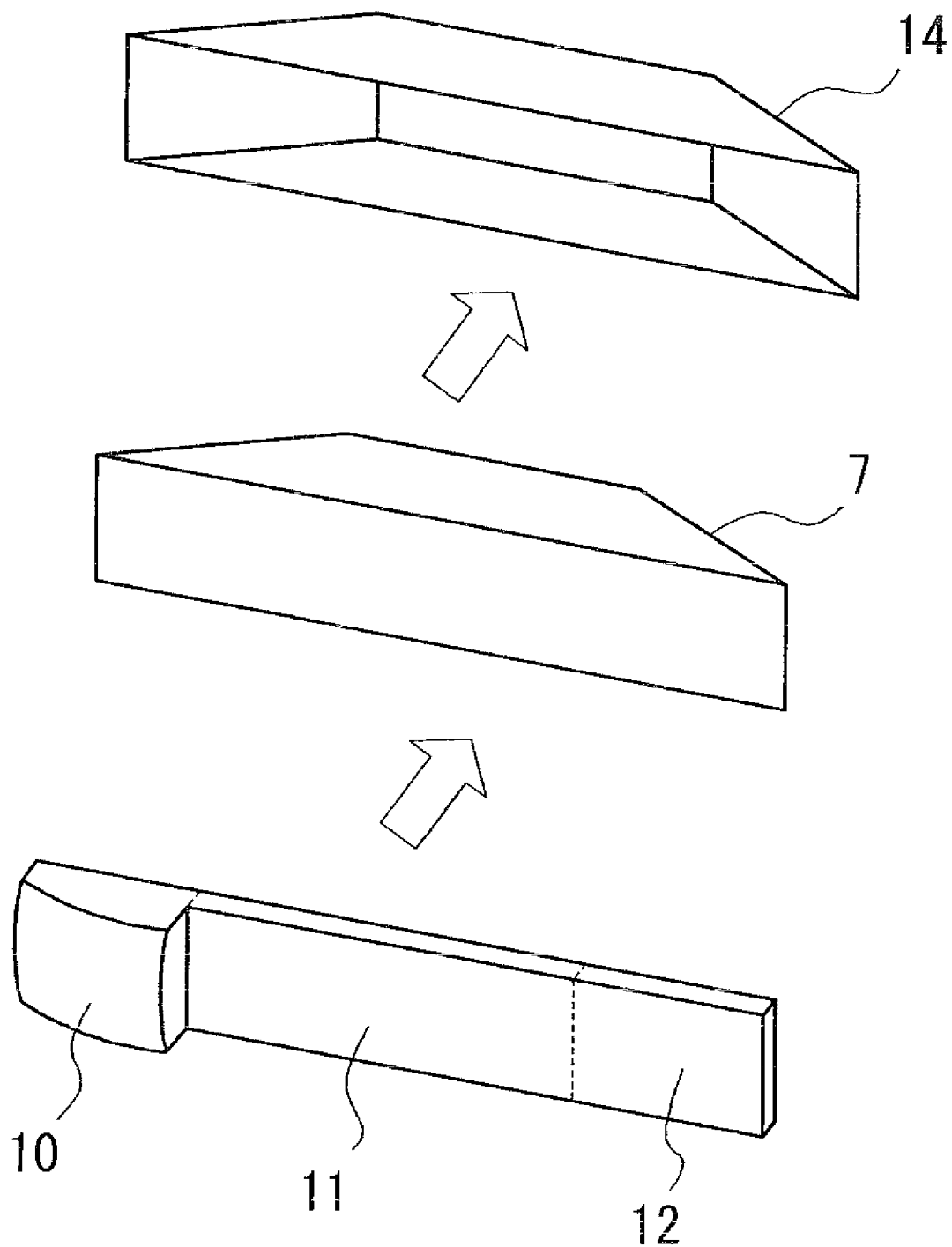
FIG. 5 is a diagram illustrating a mirror frame construction in accordance with the embodiment of the present invention.

Next, an example of a mirror frame construction for the present embodiment is illustrated with reference to FIG. 5. As shown in FIG. 5, in the mirror frame construction for the present embodiment, the hexahedron prism 7 of the present embodiment is stored in an exterior case 14 and is covered with the integrally molded optical member 11, thereby sealing the hexahedron prism 7 inside the mirror frame. As described above, the construction allows an appropriate gap to be held between the hexahedron prism 7 and the integrally molded optical member 11. In other words, in the embodiment of the present invention, the eyepiece 10 and the protection window 12 are integrally molded to create one optical member 11, and the integrally molded optical member 11 is utilized as a part of the mirror frame construction. In other words, in the present embodiment, the mirror frame construction does not only hold the air gap between the optical member 11 and the hexahedron prism 7 easily, but can be used as a sealing member to prevent raindrops or dust from entering into the air gap.

Third Embodiment

Next, still another embodiment of the light guiding optical system according to the present invention is illustrated with reference to FIG. 6.

Figure 6:
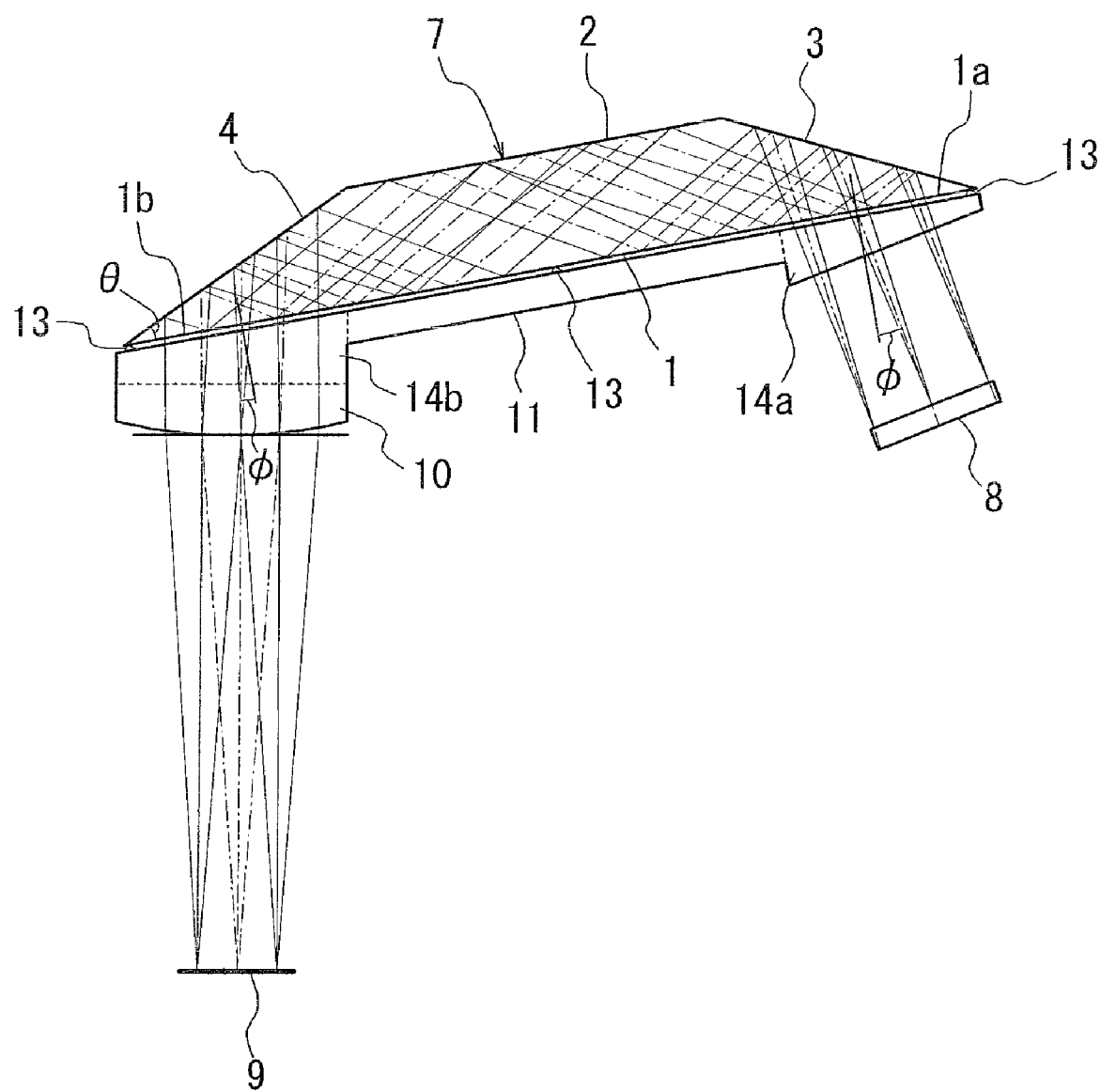
FIG. 6 is a diagram illustrating the light guiding optical system in accordance with still another embodiment of the present invention.

The light guiding optical system shown in FIG. 6 is constituted by the hexahedron prism 7 and the integrally molded optical member 11 and outputs the image light from the image display element 8 to the eye pupil 9 of the user.

The hexahedron prism 7 shown in FIG. 6 can be the same hexahedron prism 7 described in the first embodiment. In other words, the hexahedron prism 7 shown in FIG. 6 includes the first optical surface 1, the second optical surface 2, the third optical surface 3, the fourth optical surface 4, the fifth optical surface 5 and the sixth optical surface 6. The first optical surface 1 and the second optical surface 2 are opposed to each other in the hexahedron and are approximately parallel to each other. The third optical surface 3 and the fourth optical surface 4 are opposed to each other in the hexahedron and are inclined to face each other with respect to the first optical surface 1. Further, the inner angle θ between the first optical surface 1 and the third optical surface 3 is approximately equal to the inner angle θ between the first optical surface 1 and the fourth optical surface 4. On the other hand, the fifth optical surface 5 and the sixth optical surface 6 that are not shown in FIG. 6 are opposed to each other in the hexahedron and are gently inclined to face each other. Moreover, the third optical surface 3 and the fourth optical surface 4 are treated with a mirror coating.

As can be understood from FIG. 6, in the light guiding optical system of the present embodiment, the image light which is emitted from the image display element 8 is incident on the first partial optical surface 1a, which is a part of the first optical surface 1, and transmits therethrough. Thereafter the image light reflects off or totally reflects off the third optical surface 3 first, then off the first optical surface 1, the second optical surface 2, the first optical surface 1 and the fourth optical surface 4, in that order, and exits through the second partial optical surface 1b, which is another part of the first optical surface 1. At this time, the first partial optical surface 1a and the second partial optical surface 1b are covered with the integrally molded optical member 11 with an air gap interposed therebetween, and the integrally molded optical member 11 acts as a convex lens and a eccentric aberration correcting plate with respect to the light beam that exits through the second partial optical surface 1b and further acts as a eccentric aberration correcting plate with respect to the light beam that is incident on the first partial optical surface as well. In other words, the integrally molded optical member 11 can be considered as an integral molding of the eyepiece 10 and the two wedge prisms 14a and 14b. Moreover, the integrally molded optical member 11 according to the present embodiment is integrally molded by materials that are different between in a part where a light beam passes through (the convex lens 10 and the wedge prisms 14a and 14b) and in other parts (which is called a 2-color molding or a double molding).

Further, since the hexahedron prism 7 and the integrally molded optical member 11 are held with an air gap interposed therebetween, the projection 13 is molded on a part of the integrally molded optical member 11. Of course, it is preferable that the projection 13 is also molded together with the eyepiece 10, the wedge prisms 14a and 14b and the like. In addition, it is preferable that the projection 13 is disposed on the part where the image light of the first optical surface 1 does not totally reflect off. In the present embodiment, the projection 13 is disposed in the vicinity of the ridge line parts formed between the first optical surface 1 and the third optical surface 3 and between the first optical surface 1 and the fourth optical surface 4 and around the center of the first optical surface 1.

As can be seen from FIG. 6, in the optical path of the light guiding optical system of the present embodiment, the light beam from the image display element 8 is incident on the first partial optical surface 1a at an incidence angle $\phi$ through the integrally molded common optical member 11. Thereafter, the light beam repeats total reflections inside the hexahedron prism 7 and exits through the second partial optical surface 1b at an angle of refraction $\phi$ (when a symbol is put with respect to the direction, the light beam enters at an angle of $\phi$ and is emitted at an angle of $-\phi$). In other words, the path of the light guiding optical system according to the present embodiment is in what is called an inversed V shape separated at the top. In this manner, since the optical path of the light guiding optical system according to the present embodiment is in an inversed V shape, it is possible to guide the image light to the eye pupil of the user while reducing obstruction of the field of outside view.

In addition, light beam is incident obliquely on the first partial optical surface 1a and on the second partial optical surface 1b, thereby generating an aberration. In the light guiding optical system of the present embodiment, the aberration is reduced by interposing a wedge prism. In the light guiding optical system of the present embodiment, since the light beam enters at an angle of $\phi$ and exits at an angle of $-\phi$, it is preferable that the wedge angles of the wedge prism are configured to be equal in the same manner. In the configuration in which the incidence angle and the emission angle are not equal, it is obvious that the wedge angles of the wedge prism should occasionally be changed accordingly.

Figure 7:
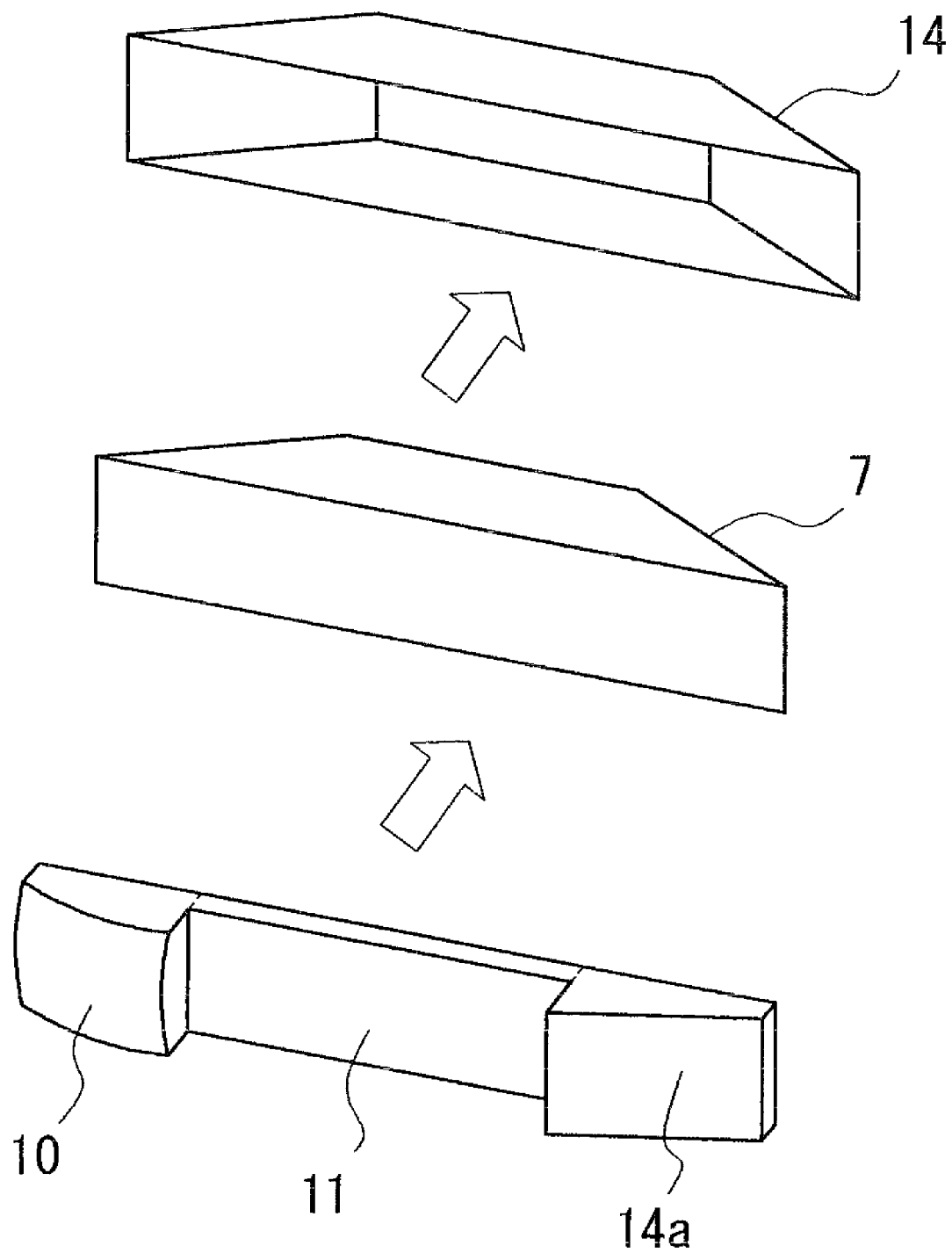
FIG. 7 is a diagram illustrating the mirror frame construction in accordance with the embodiment of the present invention.

FIG. 7 shows an example of the minor frame construction for the present embodiment. As shown in FIG. 7, in the mirror frame construction of the present embodiment, the hexahedron prism 7 is stored in the exterior case 14 and is covered with the integrally molded optical member 11, thereby sealing the hexahedron prism 7 inside the mirror frame. As described above, the construction allows an appropriate gap to be held between the hexahedron prism 7 and the integrally molded optical member 11. In other words, the example of the present minor frame construction also has the same construction as that described in the second embodiment. Consequently, in the same manner, the mirror frame construction does not only hold the air gap between the optical member 11 and the hexahedron prism 7 easily, but also can be used as a sealing member to prevent raindrops or dust from entering into the air gap.

Figure 8:
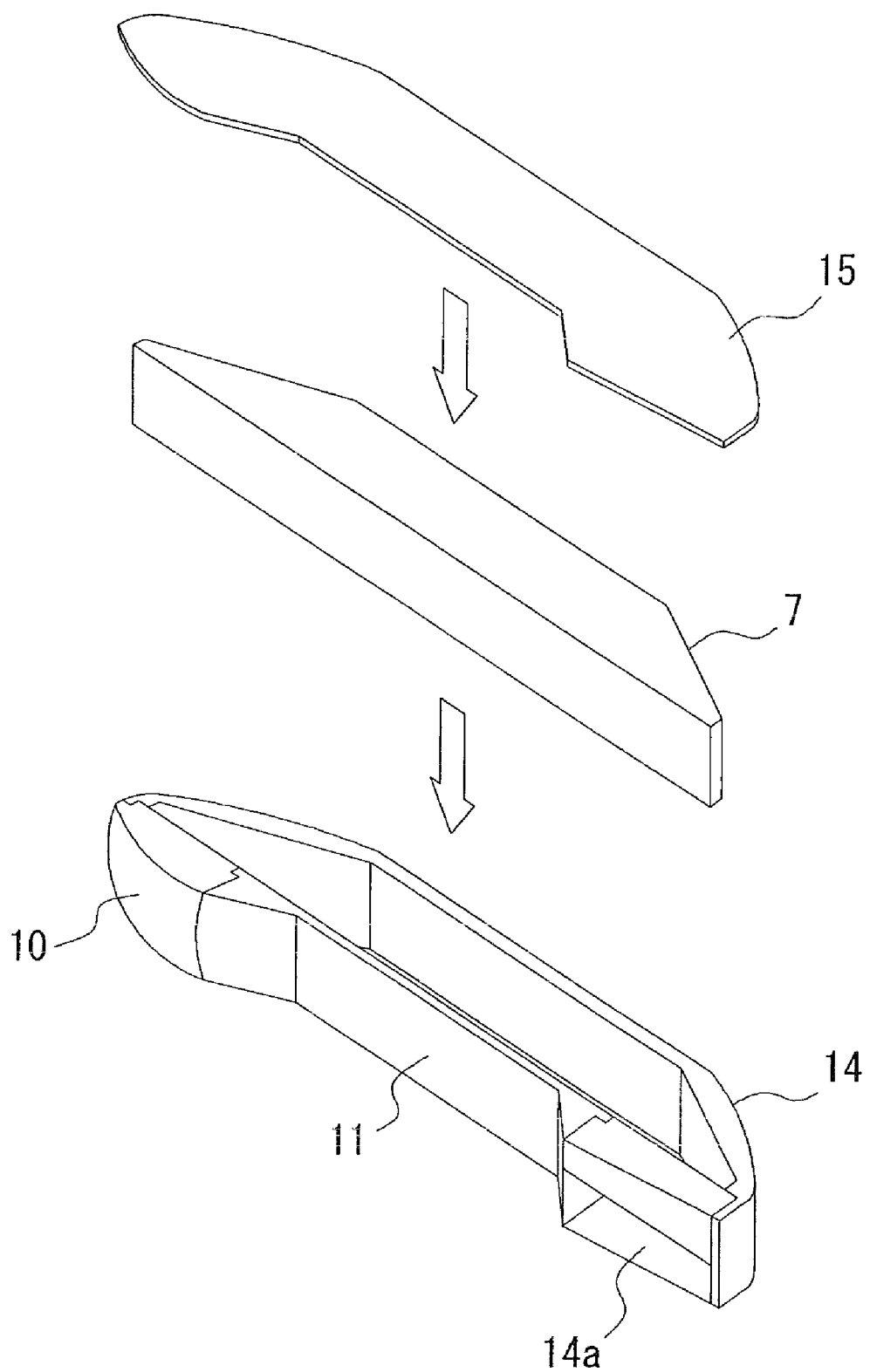
FIG. 8 is a diagram illustrating the mirror frame construction in accordance with the embodiment of the present invention.

FIG. 8 shows another example of the minor frame construction for the present embodiment. As shown in FIG. 8, in the mirror frame construction of the present embodiment, the integrally molded optical member 11 is further integrally molded with the external case 14. Then the hexahedron prism 7 is stored in the optical member 11 which is integrally molded with the external case 14 and is sealed by a cover 15. In this configuration, it is also preferable to make a double molding with materials that are different between in the part through which the light beam passes (convex lens 10 and the wedge prisms 14a and 14b) and in other parts (the external case 14 and the like).

Also in the example of the above-mentioned mirror frame construction illustrated with reference to FIGS. 7 and 8, the mirror frame construction does not only hold the air gap between the optical member 11 and the hexahedron prism 7 easily, but also can be used as a sealing member to prevent raindrops or dust from entering into the air gap, which contributes significantly to downsizing of the light guiding optical system including the mirror frame and easy manufacture thereof.

(Example of Mounting a Light Guiding Optical System onto a Head-Mounted Type Image Display Device)

The examples of mounting the light guiding optical systems according to the above-illustrated first to third embodiments onto the head-mounted type image display device are described below. However, not only the light guiding optical systems of the first to third embodiments but also appropriate alternatives thereof can be used for the head-mounted type image display device described below.

Figure 9:
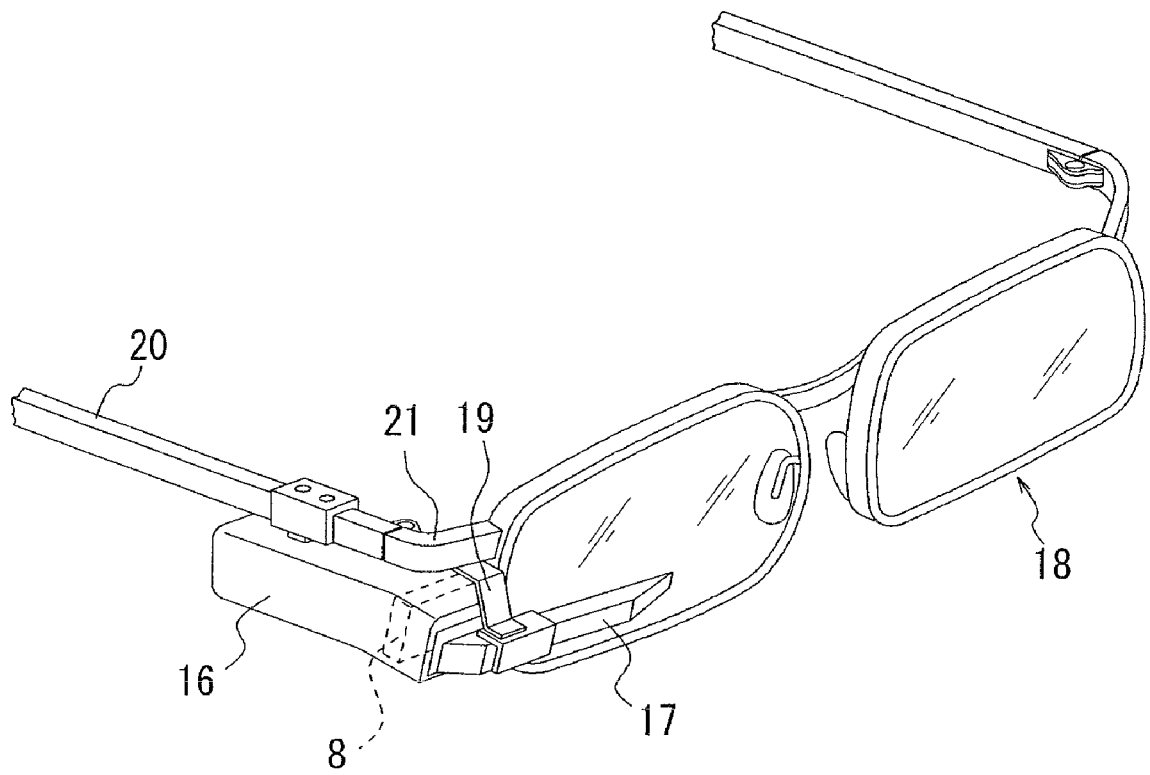
FIG. 9 is a diagram illustrating a head-mounted type image display device in accordance with the embodiment of the present invention.

The head-mounted type image display device shown in FIG. 9 is provided with a body unit 16 and an optical unit 17 and is used together with a general eyeglasses 18. The body unit 16 has a image display element 8 such as a liquid crystal panel or an organic EL and the like inside thereof, is provided with a image display element driving device and the like that are not shown, and is fixed to the temple 20 of the eyeglasses 18. The optical unit 17 includes the hexahedron prism 7 inside thereof and is configured independently from the body unit 16. Here, as the optical unit 17, the hexahedron prism 7 according to the first to third embodiments which is stored in the integrally molded optical member 11, the exterior case 14 and the like can be used. It should be noted that the optical unit 17 is fixed to an endpiece 21 through a holding member 19.

In the head-mounted type image display device using the first to third embodiments of the present invention, the image display element 8 (that is, the body unit 16) can be disposed at the part that does not obstruct the field of view by guiding the light beam while reflecting the light beam inside the hexahedron prism 7 and a image display element 8 which is smaller than the conventional one can be used because the light guiding path can be shortened. In other words, according to the present invention, downsizing of the body unit 16 and avoidance from the obstruction of the field of view can be achieved at the same time.

As for the construction shown in FIG. 9, the body unit 16 and the optical unit 17 are separated. Therefore, when the temple 20 of the eyeglasses 18 is folded, the body unit 16 is folded in conjunction therewith.

Next, a preferable disposition of the optical unit 17 will be described in more detail with reference to FIG. 10. In FIG. 10, other components are omitted to emphasize on the disposition of the optical unit 17. Further, the shape of the optical unit 17 is shown symbolically and the optical unit 17 may be provided with associated components such as a convex lens, prism and the like depending on the first to third embodiments and alternations thereof.

FIG. 10(a) is a diagram for illustrating the preferable disposition of the optical unit 17 viewed from above. The figure illustrates a relationship among the eyeglasses 18 (including the temple 20, the armor 21 and the like), an eyeball 22 and the center of eyeball 23 of the user wearing the eyeglasses 18 and the optical unit 17.

As shown in FIG. 10(a), as for the optical unit 17, the longitudinal direction thereof is disposed inclining with respect to the direction of the interpupillary distance. More particularly, it is a construction in which the long axis direction of the first optical surface and the second optical surface of the hexahedron prism 7 inside the optical unit 17 is disposed inclining with respect to the direction of the interpupillary distance. In addition, the specific inclination angles in the range from 5 to 20 degrees are preferable. In the disposition example shown in FIG. 10(a), the angle is 10 degrees. In other words, it is preferable that the normal line of the first optical surface (and the second optical surface) is inclined at an angle from 5 to 20 degrees with respect to the visual axis of the user in the frontal direction, which is 10 degrees in the disposition shown in the figure.

In addition, it is preferable that the optical axis of the image light output from the optical unit 17 and the visual axis of the user in the frontal direction are disposed so that the angle therebetween is from 15 to 25 degrees. Specifically, the angle is 20 degrees in the disposition example shown in FIG. 10(a).

Further, it is preferable that the optical axis of the image light is disposed inclining outward with respect to the visual axis of the user in the frontal direction. In other words, when the optical unit 17 is disposed at the right eye, the optical axis of the image light is disposed at an angle of 15 to 25 degrees rightward with respect to the visual axis in the frontal direction. When disposing at the left eye, it is obvious that the optical axis is disposed inclining leftward is preferable.

FIG. 10(b) is a diagram for illustrating a preferable disposition of the optical unit 17 viewing from the front.

As shown in FIG. 10(b), the optical unit 17 is disposed under the horizontal plane that connects the centers of the right and the left eyeballs. In addition, the optical unit 17 is disposed outside the vertical line that passes through the center of the eyeball 23. More particularly, it is preferable that the eyepiece 10 of the optical unit 17 is disposed at an angle of 10±5 degrees downward and 20±5 degrees outward with respect to the visual axis of the user in the frontal direction.

As in the case of the disposition shown in FIGS. 10(a) and 10(b), the head-mounted type image display device can be used in a state where eyesight is corrected depending on the user by providing a configuration that allows for entering of the image light from the image display element 8 into the optical unit 17 through lateral external side of the lens of the eyeglasses 18 and guiding the image light output from the optical unit 17 to the eyeball 22 of the user through the lens of the eyeglasses 18. In other words, the diopter scale adjustment mechanism required for the configuration which is used without involving the lens of the eyeglasses is not required for the head-mounted type image display device of the present construction.

Figure 11:
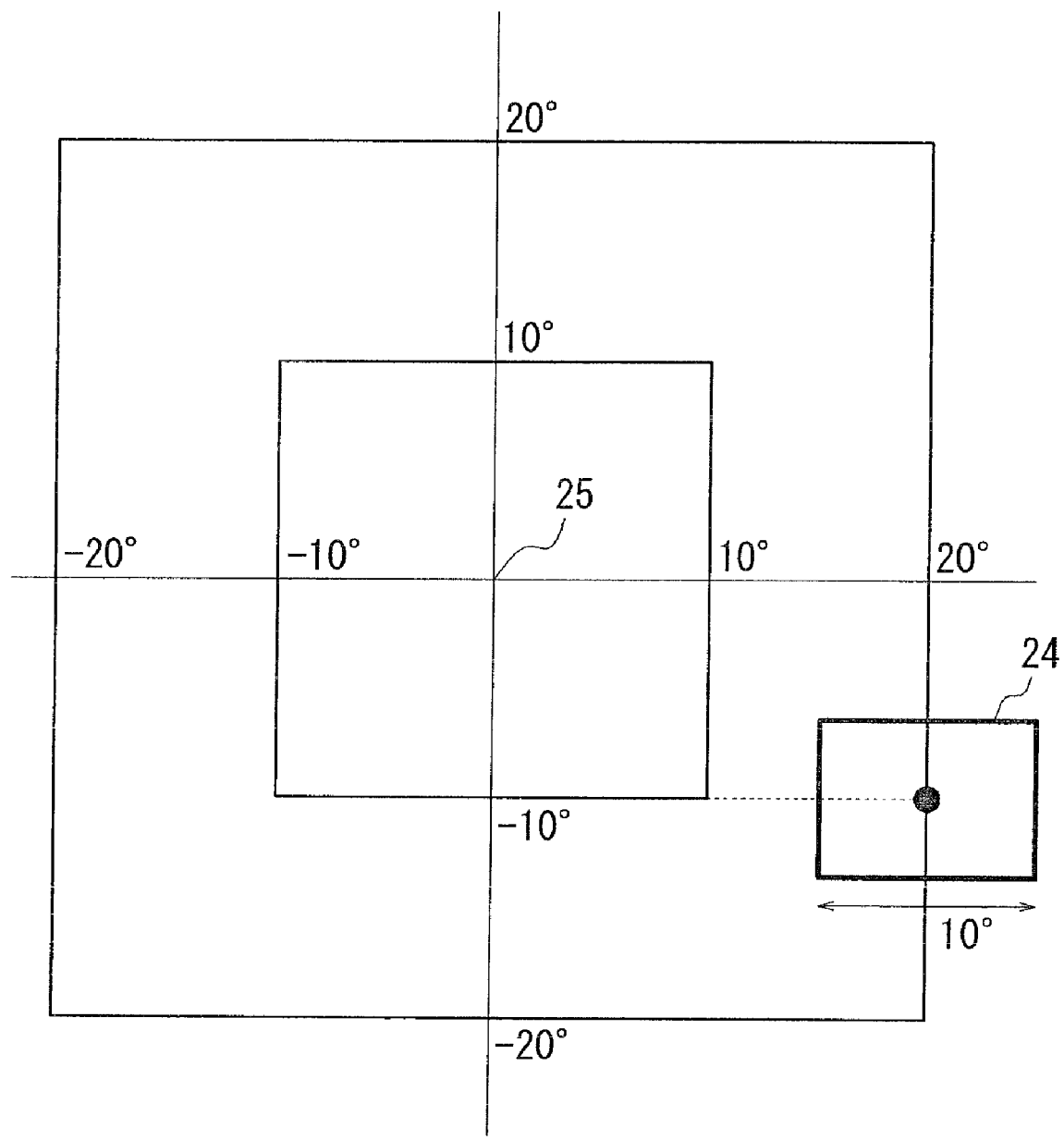
FIG. 11 is a diagram illustrating a image display position within the visual field of right eye in accordance with the embodiment of the present invention.

FIG. 11 shows an image display position in the field of vision of the right eye of the user in the case where the head-mounted type visual display device having the above-described configuration is used. As shown in the figure, according to the head-mounted type image display device having the above-described construction, the image field 24 is displayed at a position at an angle of 20±5 degrees rightward and 10±5 degrees downward with respect to the visual axis in the frontal direction 25. In addition, in the case where the head-mounted type image display device is used for the left eye, it is preferable that the image field 24 is displayed at an angle of 20±5 degrees leftward with respect to the visual axis in the frontal direction 25. Moreover, it is also preferable that the image is displayed at a position at an angle of 10±5 degrees upward instead of 10±5 degrees downward.

With the above-described construction, the user of the head-mounted type image display device according to the present invention can carry out both the usual works based on the information from the field of outside view and the works based on the information from the head-mounted type image display device with less burden.

INDUSTRIAL APPLICABILITY

The present invention is useful in application in which the image light of the video image or still image displayed by a compact video display element is guided to the eye pupil of the user by use of the optical means.

What is claimed is:

1. A head-mounted type image display device comprising a hexahedron prism,
   in the hexahedron prism,
   a first optical surface and a second optical surface opposed to each other are approximately parallel;
   inner angles $\theta$ between each of a third optical surface and a fourth optical surface that are opposed to each other and the first optical surface are equal; and
   a fifth optical surface and a sixth optical surface opposed to each other are configured to be inclined toward each other and the distance therebetween becomes narrow from the third optical surface to the fourth optical surface, wherein
   a light beam from an image display element enters through a first partial optical surface, which is a part of the first optical surface, into the hexahedron prism, reflects off the third optical surface first, then off the first optical surface, the second optical surface, the first optical surface and the fourth optical surface, in that order, and exits through a second partial optical surface, which is another part of the first optical surface, in a direction of an eye pupil of a user, thereby projecting an image.

2. The head-mounted type image display device according to claim 1, wherein the inner angle $\theta$ is approximately 30 degrees.

3. The head-mounted type image display device according to claim 1, wherein with respect to the hexahedron prism adjacent to the second partial optical surface, a width of a projection cross section in an optical axis direction is equal to or less than 4 mm, which is smaller than a diameter of an eye pupil of an eye ball.

4. The head-mounted type image display device according to claim 1, wherein the first partial optical surface and the second partial optical surface are covered with an integrally molded common optical member with an air gap interposed therebetween, and the integrally molded common optical member acts as a convex lens with respect to the light beam exiting through the second partial optical surface.

5. The head-mounted type image display device according to claim 4, wherein the integrally molded common optical member acts as a wedge prism as well with respect to the light beam exiting through the second partial optical surface and acts as a wedge prism with respect to the light beam entering through the first partial optical surface from the image display unit as well.

6. The head-mounted type image display device according to claim 5, wherein the light beam from the image display element is incident on the first partial optical surface at an incidence angle $\phi$ through the integrally molded common optical member.

7. The head-mounted type image display device according to claim 6, wherein the incidence angle $\phi$ is between 5 to 15 degrees.

8. The head-mounted type image display device according to claim 5, wherein a normal line of the first optical surface and the second optical surface is configured to be disposed inclining at an angle from 5 to 20 degrees with respect to a visual axis of a user in a frontal direction.

9. The head-mounted type image display device according to claim 5, wherein the optical beam axis exiting through the second partial optical surface and a visual axis of a user in a frontal direction have an angle of 20±5 degrees in a horizontal direction and an angle of 10±5 degrees in a vertical direction.

10. The head-mounted type image display device according to claim 1, wherein the head-mounted type image display device is used together with an eyeglasses and the light beam exiting from the hexahedron prism projects the image in the direction of the eye pupil of the user through a lens of the eyeglasses.

* * * * *